United States Patent
Patent No.: 7913
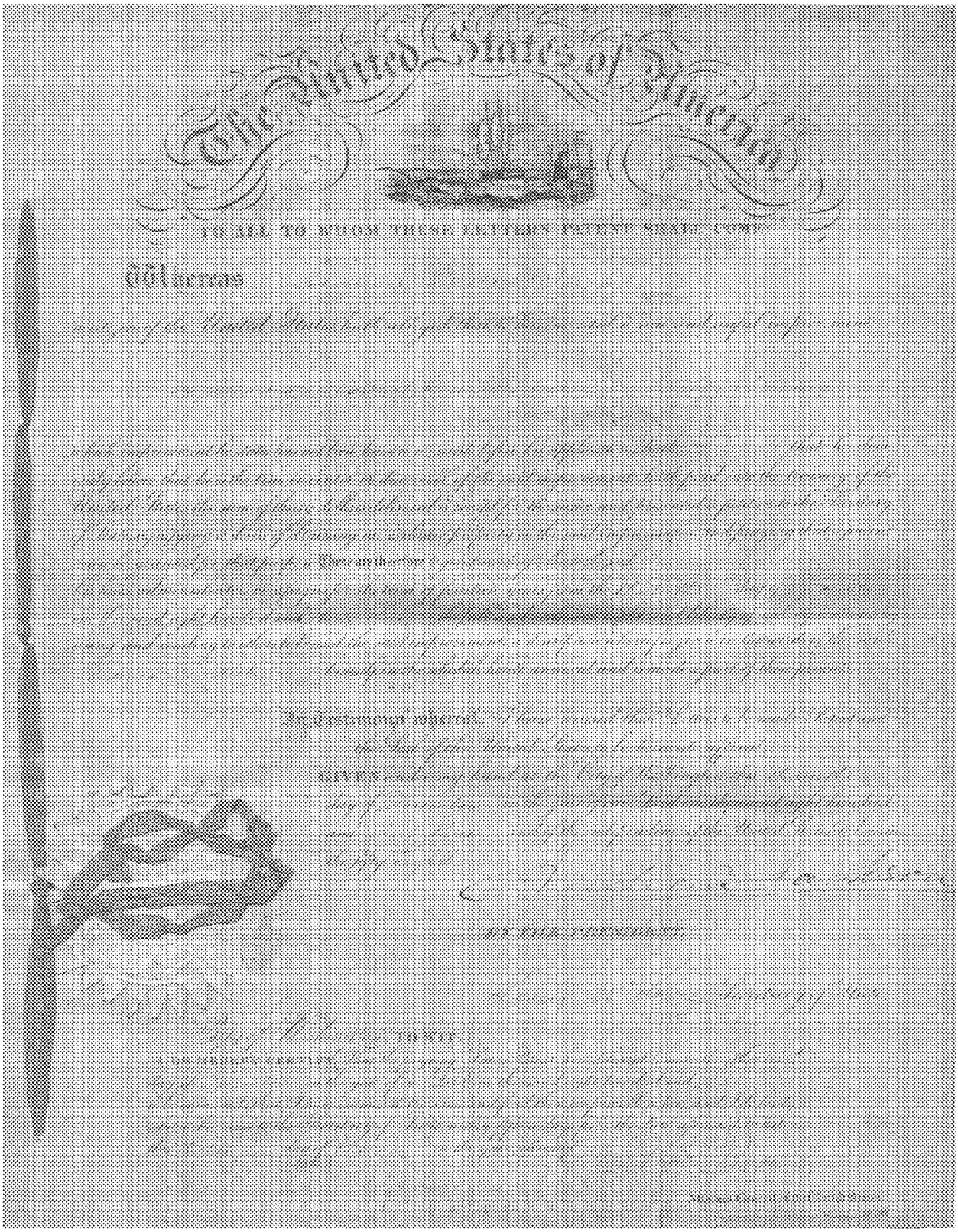
The United States of America
TO ALL TO WHOM THESE LETTERS PATENT SHALL COME:
Gilbertas

United States Patent

Patent No.: 7913

United States Patent

Patent No.: 7913